United States Patent
Boyd et al.

(10) Patent No.: US 6,263,159 B1
(45) Date of Patent: Jul. 17, 2001

(54) CAMERA HAVING RESILIENTLY BIASING LABEL AND METHOD

(75) Inventors: James D. Boyd, Rochester; Stephen J. Smith, Shortsville; Michael P. Cramer, Victor, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/360,432

(22) Filed: Jul. 26, 1999

(51) Int. Cl.[7] .............................. G03B 17/02; G03B 1/00
(52) U.S. Cl. ................... 396/6; 396/411; 396/535
(58) Field of Search ............................ 396/6, 395, 411, 396/535, 536, 538, 541, 502

(56) References Cited

U.S. PATENT DOCUMENTS

| | | | |
|---|---|---|---|
| 2,336,279 | 12/1943 | Mihalyi | 396/411 |
| 3,273,478 | 9/1966 | Kinder | 396/176 |
| 3,761,168 | 9/1973 | Utsumi et al. . | |
| 4,139,285 | 2/1979 | Ziegler . | |
| 4,540,265 | 9/1985 | Harvey | 396/163 |
| 4,972,649 | 11/1990 | Mochida et al. | 53/430 |
| 5,068,575 | 11/1991 | Dunsmore et al. | 315/241 P |
| 5,235,366 | 8/1993 | Kucmerowski | 396/387 |
| 5,472,543 | 12/1995 | Yokajity | 156/249 |
| 5,517,269 | 5/1996 | Boyd et al. | 396/6 |
| 5,557,356 | 9/1996 | Ishida et al. | 356/6 |
| 5,614,975 | 3/1997 | SanGregory et al. | 396/396 |
| 5,628,032 | 5/1997 | Zander | 396/6 |
| 5,652,930 | 7/1997 | Teremy et al. | 396/287 |
| 5,748,989 * | 5/1998 | Sangregory et al. | 396/6 |
| 5,761,542 | 6/1998 | Lamphron et al. | 396/6 |
| 5,842,072 | 11/1998 | Zander et al. . | |
| 5,873,002 | 2/1999 | Glanville, Sr. et al. | 396/6 |
| 6,049,675 * | 4/2000 | DiRisio et al. | 396/6 |
| 6,078,749 * | 6/2000 | Rydelek et al. | 396/6 |

FOREIGN PATENT DOCUMENTS

| | | |
|---|---|---|
| 3113576 A1 | 4/1981 | (DE) . |
| 5134361 | 5/1993 | (JP) . |
| 7114147 | 5/1995 | (JP) . |

* cited by examiner

Primary Examiner—David M. Gray
(74) Attorney, Agent, or Firm—Robert Luke Walker

(57) ABSTRACT

A camera has a casing and a subsystem having a first mechanical element and a second mechanical element. The first mechanical element is movable relative to the casing, between an engaged position and a disengaged position. The mechanical elements are engaged. The subsystem is operative in the engaged position. The subsystem is inoperative in the disengaged position. A label is attached to the casing. The label biases the first mechanical element toward the engaged position. In a method for rendering a one-time use camera operative, a camera frame assembly and a compliant label are aligned. The camera frame assembly has the subsystem having a first and second mechanical elements and an uncovered gap. The first mechanical element is movable relative to the gap, between the engaged and disengaged positions. The mechanical elements are engaged and the subsystem is operative in the engaged position and inoperative in the disengaged position. A label is attached to the camera frame assembly over the gap to bias the first mechanical element toward the engaged position.

20 Claims, 10 Drawing Sheets

CAMERA HAVING RESILIENTLY BIASING LABEL AND METHOD

CROSS REFERENCE TO RELATED APPLICATIONS

Reference is made to commonly assigned, co-pending U.S. patent applications Ser. No. 09/361,057, entitled: CAMERA HAVING LABEL MOUNTED ELECTRICAL COMPONENT, filed Jul. 26, 1999, in the names of James D. Boyd, Stephen J. Smith, and Michael P. Cramer; Ser. No. 09/360,576, entitled: METHOD FOR ASSEMBLING CRITICALLY POSITIONED CAMERA COMPONENT ON CAMERA BODY, filed in Jul. 26, 1999, the names of James D. Boyd, Stephen J. Smith, and Michael P. Cramer; Ser. No. 09/360,909, entitled: CAMERA HAVING LIGHT-BLOCKING LABEL, filed Jul. 26, 1999, in the names of James D. Boyd, Stephen J. Smith, and Michael P. Cramer; Ser. No. 09/361,637, entitled: CAMERA HAVING LABEL INCLUDING OPTICAL COMPONENT, filed Jul. 26, 1999, in the names of James D. Boyd, Stephen J. Smith, and Michael P. Cramer; Ser. No. 09/360,908, entitled: ONE-TIME USE CAMERA HAVING BREAKABLE COMPONENT AND RECYCLING METHOD, filed Jul. 26, 1999, in the names of James D. Boyd, Stephen J. Smith, and Michael P. Cramer; Ser. No. 09/360,752, entitled: CAMERA HAVING LABEL-STOPPED OPTICAL SYSTEM, filed Jul. 26, 1999, in the names of James D. Boyd, Stephen J. Smith, and Michael P. Cramer; Ser. No. 09/361,056 entitled: ONE-TIME USE CAMERA LOADING METHOD, filed Jul. 26, 1999, in the names of James D. Boyd, Stephen J. Smith, and Michael P. Cramer each of which are assigned to the assignee of this application.

FIELD OF THE INVENTION

The invention relates to photography and photographic equipment and more particularly relates to a camera having a resiliently biasing label and a film loading method.

BACKGROUND OF THE INVENTION

Because one-time use cameras are manufactured in very large quantities, small changes in costs of individual components present major consequences in aggregation. Biasing elements, such as small metal springs are relatively costly items in one-time use cameras, particularly if the cost of assembly is considered. Resilient elements can be provided as portions of larger molded plastic components, but this can present problems in achieving accurate spring biasing and in detecting defects.

U.S. Pat. No. 5,472,543 discloses a method for accurately attaching compliant labels to camera bodies. Compliant labels are cut from larger sheets of material. it is ordinarily easier to provide uniform physical characteristics in conventionally manufactured shape material than in molded plastic components.

It is known to provide labels and other one-time use camera parts that are replaced when the camera is recycled. U.S. Pat. No. 5,761,542 discloses a one-time use camera in which a film door includes an anti-backup pawl that breaks when the film door is opened and must be replaced to recycle the camera. The shortcoming is that the film door must include the anti-backup pawl.

It is known to load film in a one-time use camera by installing a film cartridge, light-tightly closing the camera, disabling an anti-backup, and prewinding the film onto a second spool by rotating an exposed portion of the second spool. (See, for example, U.S. Pat. No. 4,972,649 and Japanese Patent Publication JP5-134361, published May 28, 1993) The anti-backup is reenabled after the film is prewound. The shortcoming is that the enabling and reenabling are additional steps and are not simple to perform using automated equipment.

JP7-114147 (published May 2, 1995) discloses an anti-backup pawl that is biased by a projection of the back cover. The back cover is shown as closing the film chambers.

It would thus be desirable to provide an improved cameras in which a label provides biasing for a mechanical element.

SUMMARY OF THE INVENTION

The invention is defined by the claims. The invention, in its broader aspects, provides a camera that has a casing and a subsystem having a first mechanical element and a second mechanical element. The first mechanical element is movable relative to the casing, between an engaged position and a disengaged position. The mechanical elements are engaged. The subsystem is operative in the engaged position. The subsystem is inoperative in the disengaged position. A label is attached to the casing. The label biases the first mechanical element toward the engaged position. In a method for rendering a one-time use camera operative, a camera frame assembly and a compliant label are aligned. The camera frame assembly has the subsystem having a first and second mechanical elements and an uncovered gap. The first mechanical element is movable relative to the gap, between the engaged and disengaged positions. The mechanical elements are engaged and the subsystem is operative in the engaged position and inoperative in the disengaged position. A label is attached to the camera frame assembly over the gap to bias the first mechanical element toward the engaged position.

It is an advantageous effect of the invention that improved cameras are provided in which a label provides biasing for a mechanical element.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
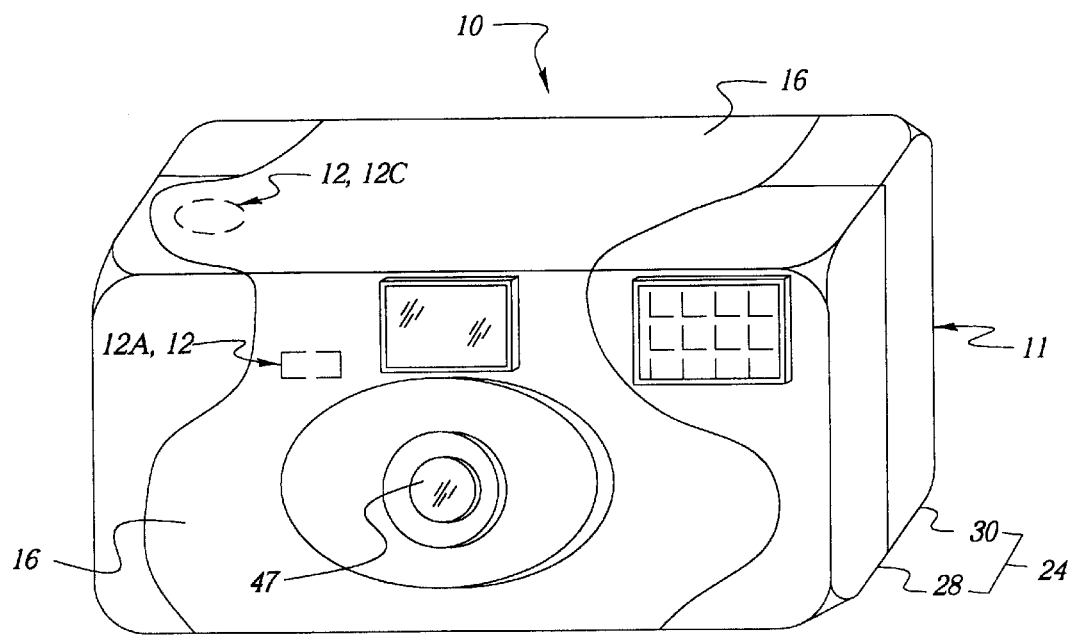
FIG. 1 is a front perspective view of an embodiment of the camera of the invention. Positions of first mechanical elements of three subsystems are indicated by dashed lines.
Figure 2:
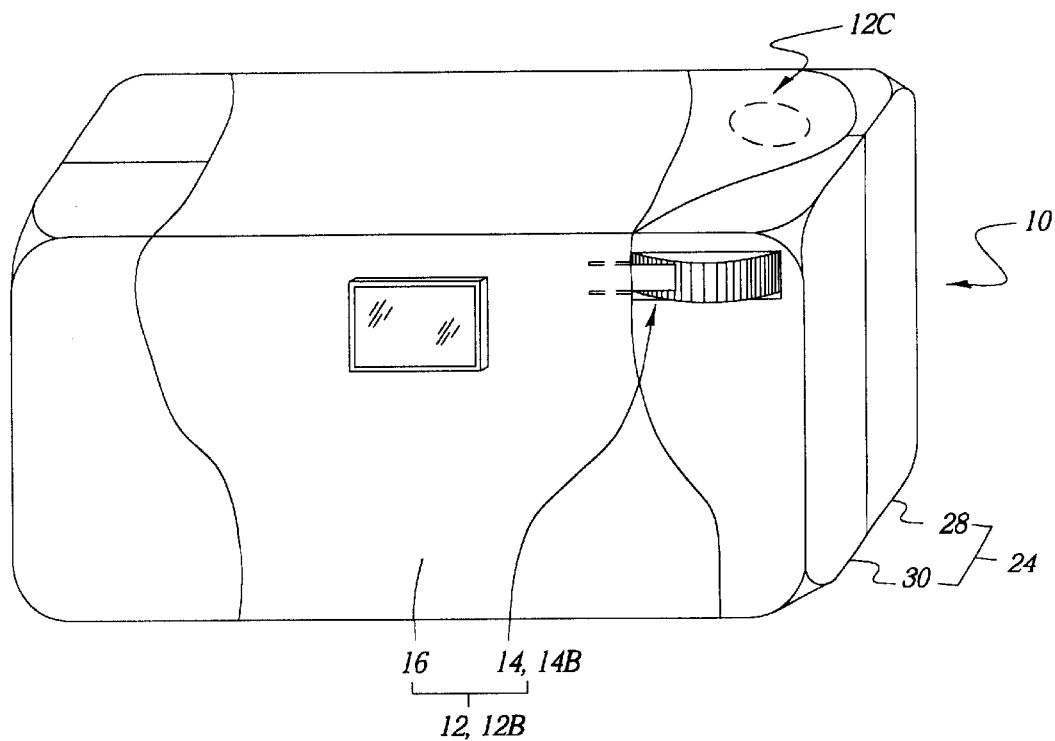
FIG. 2 is a rear perspective view of the camera of FIG. 1. Positions of first mechanical elements of two subsystems are indicated by dashed lines.

The camera 10 of the invention has a mechanism 12 including a subsystem 14 and a compliant label 16 that biases a mechanical element 18 of the subsystem 14. The label 16 is used instead of a separate biasing spring. The camera 10 has reduced costs for parts and assembly and in addition can provide greater uniformity when mass produced.

The subsystem 14 has the first mechanical element 18 and a second mechanical element 20. The first mechanical element 18 adjoins a gap 22 in the casing 24 of the camera 10. The compliant label 16 is affixed to the casing 24 over the gap 22 and biases the first mechanical element 18 toward the second mechanical element 20.

Detailed features of the subsystems 14 can vary and a single camera 10 can include multiple subsystems 14. The same label 16 can be shared by more than one subsystem 14 or individual labels 16 can be used with individual subsystems 14. For convenience, the invention is generally disclosed herein in relation to a camera 10 having multiple subsystems 14 of the invention and a single label 16. The subsystems 14 are discussed individually herein in terms of specific mechanical features; however, general terminology such as "first mechanical element" is sometimes used to emphasis considerations that are broadly applicable to the various embodiments. To clarify the commonality of features, reference numbers without added letters are used for some terms. The same reference numbers with letters identify specific forms of the same general features, in the different embodiments.

Figure 10:
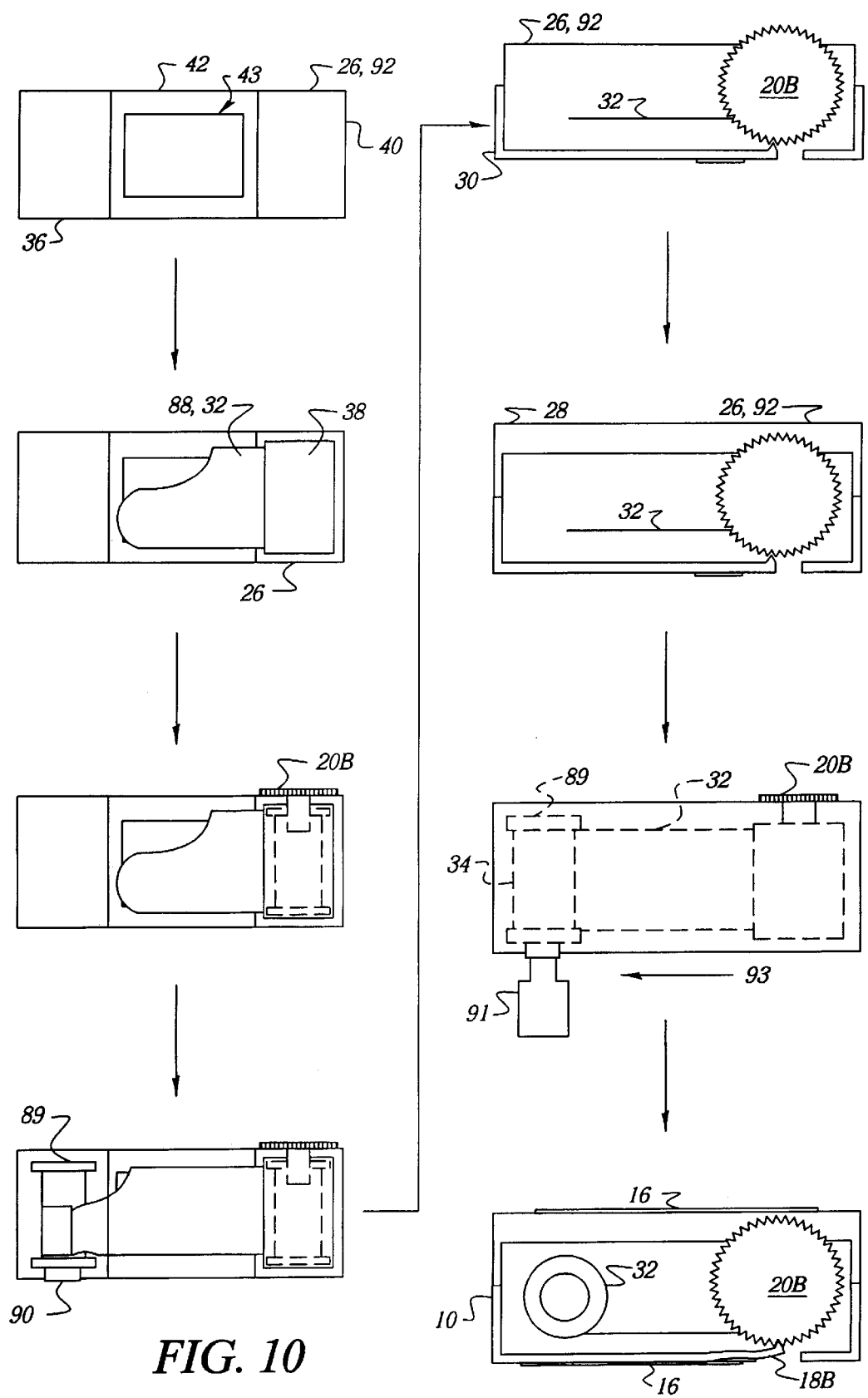
FIG. 10 is a diagrammatical view of the method of film loading. The camera frame, assembly, and completed camera are depicted in top and side views in different steps. Top views are those in which the thumbwheel appears as a jagged circle.

The camera 10 has a body 11 including a frame 26 and casing 24. The casing 24 has front and back covers 28,30 that enclose the frame 26. The label 16 is attached to one or both covers 28,30. The camera 10 has the following subsystems 14 that act in conjunction with the label 16. A film transport subsystem 14a advances a filmstrip 32 on a film frame-by-film frame basis from a film roll 34 in a film supply chamber 36 to a cartridge 38 held within a film cartridge chamber 40. The term "film frame" is used to refer to a length of filmstrip 32 equal to the length of the exposure chamber 42 in the direction of filmstrip travel. (The exposure chamber 42 and an exposure opening 43 through which light enters to expose the film 32, are shown in FIG. 10.) The film transport 14a also meters the filmstrip 32, that is, advances the filmstrip 32 by a film frame and then halts advancement in preparation for the next exposure. An anti-backup subsystem 14b prevents reverse rotation of a thumbwheel 20b connected to a spool 45 in the film cartridge 38. An exposure subsystem 14c includes a shutter 46 that opens to direct light through a lens 47 and aperture 48 and the exposure opening 43 to a film frame positioned in an exposure chamber 42.

Figure 3:
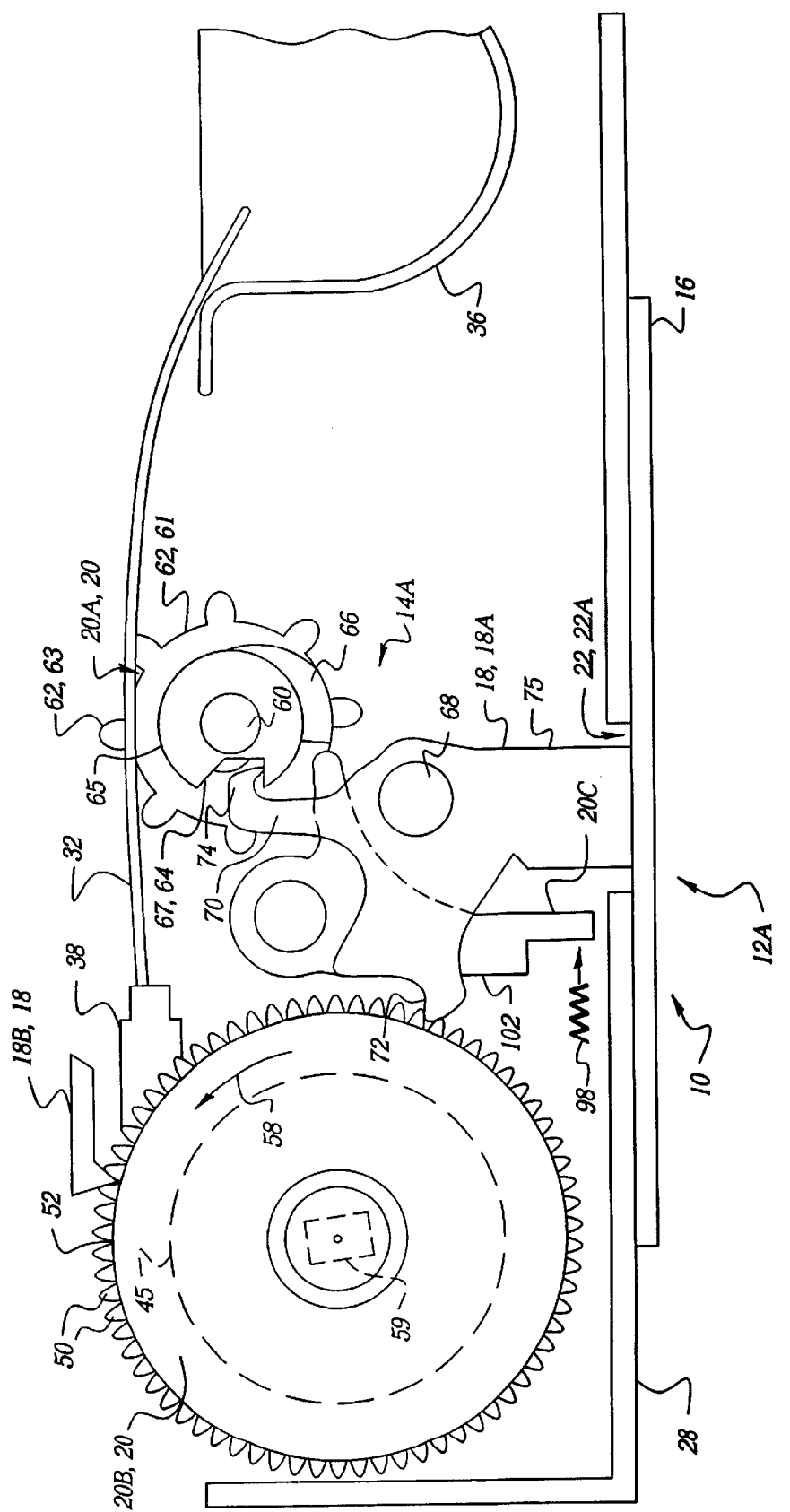
FIG. 3 is a top view of the camera of FIG. 1 with parts removed to show features of film transport, anti-backup, and exposure subsystems. The metering lever is in the metered position. In this and other drawings, some parts are exaggerated slightly for clarity and springs are represented diagrammatically.
Figure 4:
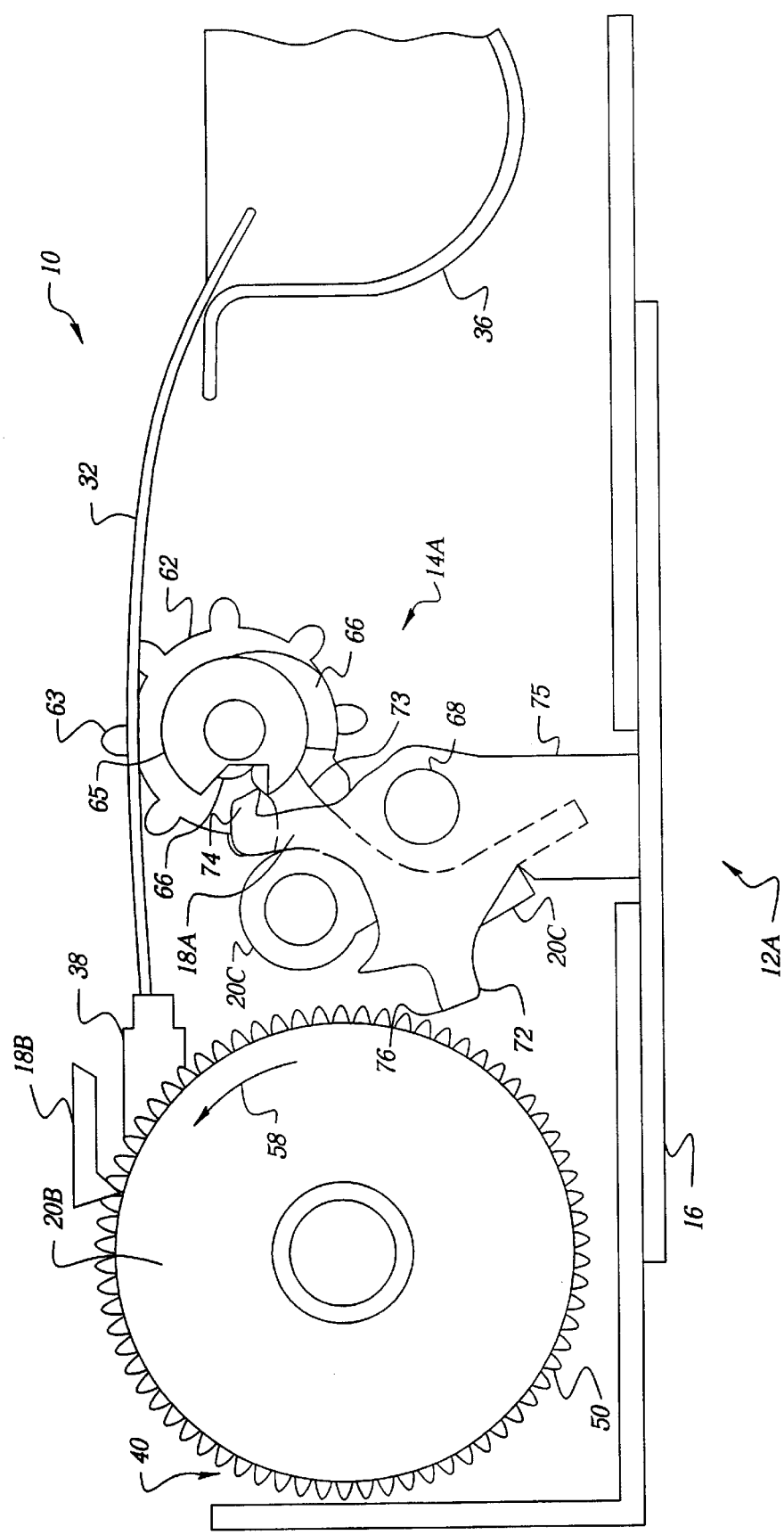
FIG. 4 is the same view as FIG. 3, with the metering lever is in a non-metered position.
Figure 6:
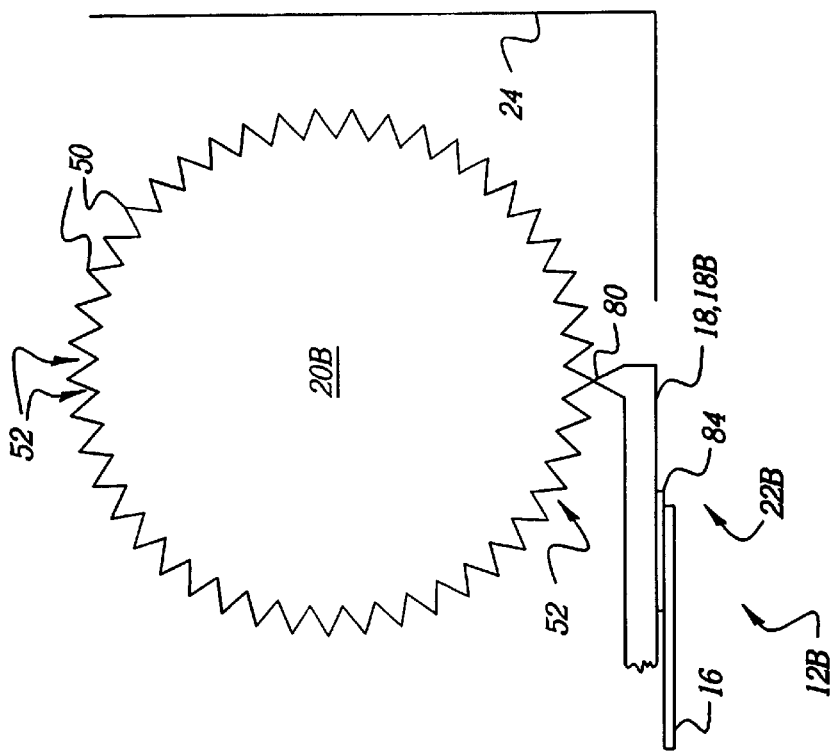
FIG. 6 is the same view as FIG. 5, with the pawl is in a bypass position.
Figure 5:
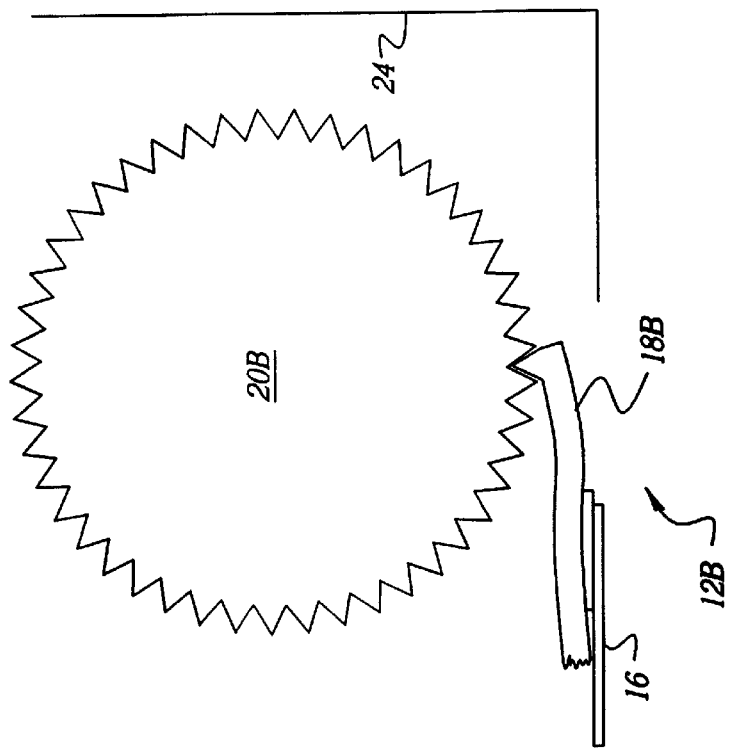
FIG. 5 is a top view of the camera of FIG. 1 with parts removed to show features of the anti-backup subsystem. The pawl is in a meshed position.
Figure 8:
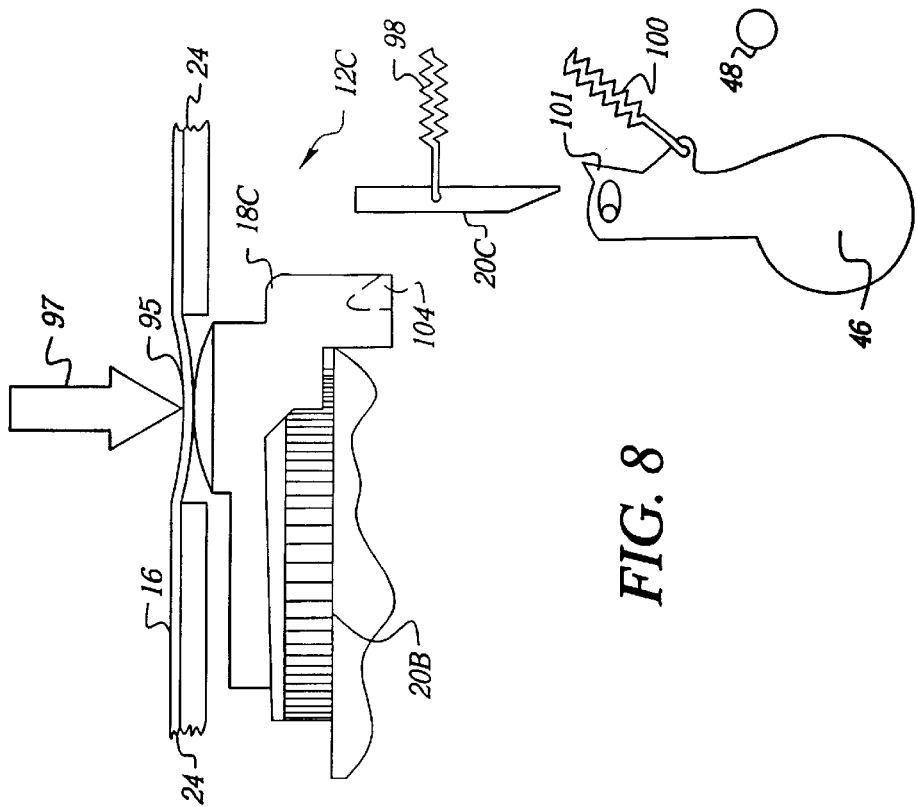
FIG. 8 is the same view as FIG. 7, during an exposure operation. The trigger in the released position.
Figure 7:
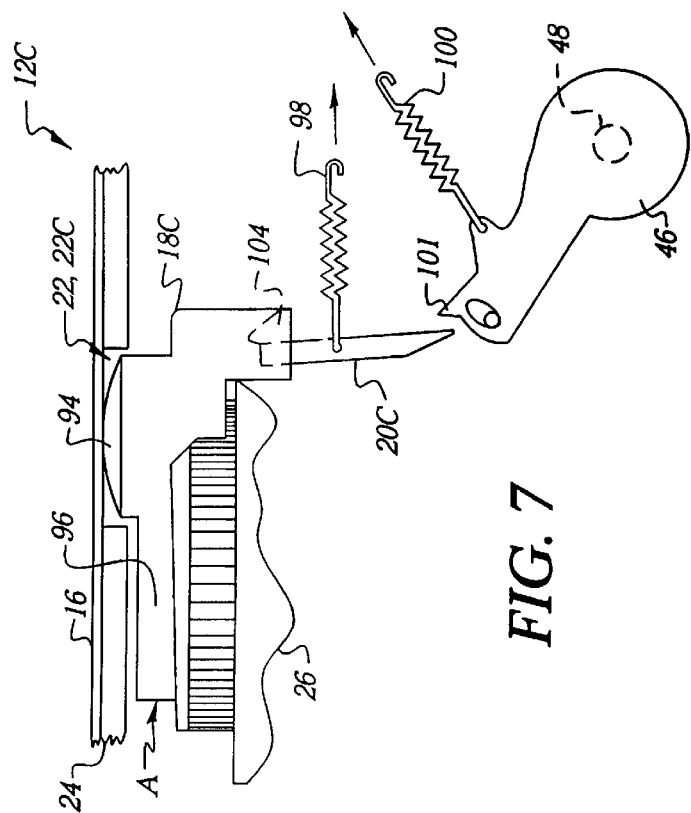
FIG. 7 is a front view of the camera of FIG. 1 with parts removed to illustrate the exposure subsystem. The trigger is in a set position.

Referring now particularly to FIGS. 1 and 3–4, mechanism 12a of the camera 10 has a film transport subsystem 14a including a first mechanical element 18 that is a metering lever 18a. The second mechanical element 20 is a cam unit 20a. The film transport subsystem 14a includes a thumbwheel 20b rotatably mounted in the body 11. A sector of the thumbwheel 20b extends beyond the casing 24 for access by the user. The thumbwheel 20b has a circular array of teeth or serrations 50 and intervening gullets 52. The gullets 52 are complementary to, and face, a projection of a pawl 18b. (The term "complementary" as used herein does not necessarily indicate an exact geometric match, but rather a similarity of shapes sufficient to allow firm contact.) In the illustrated embodiments, the teeth 50 of the thumbwheel 20b are contacted by the user when rotating the thumbwheel 20b. The teeth 50 and the surface contacted by the user can be separated or the thumbwheel 20b can be rotated indirectly, if desired.

Rotation of the thumbwheel 20b in an advance direction, indicated by arrow 58 in FIG. 3, advances the filmstrip 32 sequentially from the supply chamber 36 into the film cartridge 38. The type of film cartridge 38 is not critical. (The figures diagrammatically illustrate a Type 135 (35 mm) film unit.) The cartridge 38 is positioned in a film cartridge chamber 40 under the thumbwheel 20b. The cartridge 38 includes a slotted spool (not separately illustrated), that is mated to a projection 59 on the thumbwheel 20b, so rotation of the thumbwheel 20b turns the cartridge spool 46 and draws the filmstrip 32 from the supply chamber 36, across an exposure chamber 42 and into the cartridge 38. Further details of film transports of this general type are disclosed, for example, in U.S. Pat. No. 5,235,366, issued Aug. 10, 1993; and U.S. Pat. No. 5,614,975, issued Mar. 25, 1997.

The cam unit 20a has a shaft 60 that is rotatably mounted in the body 11. Rotatable mountings (not separately illustrated) discussed herein are provided in a manner well known to those in skill in the art by bushings or the like in the frame or other camera structure. A sprocket 62 is mounted in fixed relation to the shaft 60. Sprocket 62 includes a hub 61 with cogs 63 that engage and extend into perforations (not separately illustrated) along an edge of the filmstrip 32. The cogs 63 have a circumferential spacing equal to the distance between the perforations. When the film transport 14a advances the filmstrip 32 from the supply chamber 36 toward the cartridge 38, engagement between the film perforations and cogs 63 drives the sprocket 62 in a forward direction of rotation (counterclockwise in FIGS. 3–4). One complete revolution of the sprocket 62 corresponds to the pitch between adjacent film frames, that is, the distance the filmstrip 32 moves between each sequential exposure. On the shaft 60 of the cam unit 20a above the sprocket 62 is a primary cam 64 having a circular margin 65 interrupted by a notch 67 and a secondary cam 66. The cams 64,66 are secured to the shaft 60, with the primary cam 64 above the secondary cam 66 and the two cams 64,66 rotate with the sprocket 62, one revolution for each film frame.

The metering lever 18a has a shaft 68 that is pivotably mounted in the body 11. Fixed to the shaft 60 are a follower arm 70 and a blocker arm 72. The follower arm 70 of the metering lever 18a has a sprag 74 that is complementary to the notch 67 of the primary cam 64. The blocker arm 72 has an engagement portion 76 that is complementary to a tooth 50 of the thumbwheel 20b. The blocker arm 72 also has a contact portion 75 that extends forward through the gap 22a in the casing 24 to the label 16.

The metering lever 18a can pivot between a metered or engaged position and a non-metered or first disengaged position. (In FIGS. 3–4, pivoting of the metering lever 18a from the metered position to the non-metered position is a counterclockwise rotation and pivoting from the non-metered position to the metered position is a counterclockwise rotation.) In the metered position, the sprag 74 is in the notch 67 of the primary cam 64, and the engagement portion 76 meshes with a tooth 50 of the thumbwheel 20b and blocks rotation of the thumbwheel 20b. The filmstrip 32 is positioned for exposure of the next film frame. In the non-metered position, the sprag 74 rides on the circular margin 65 of the primary cam 64 and the engagement portion 76 and thumbwheel 20b are unmeshed. The thumbwheel 20b can be rotated to advance the filmstrip 32 to the next film frame. The label 16 biases the metering lever 18a toward the metered position. Absent the label 16, the metering lever 18a can be pivoted from the engaged position, past the first disengaged position, to a second disengaged position in which the sprag 74 is spaced from the cam unit 20a. When the label 16 is in place, biasing toward disengagement is overcome and movement of the metering lever 18a to the second disengaged position is blocked. The metering lever 18a can be freely movable between the active and disengaged positions absent the label 16 or can be biased toward disengagement, that is, away from the engaged position, by internal biasing or an external spring (not shown). Biasing the first mechanical element 18 into a second disengaged position when the label 16 is removed helps keep the first and second mechanical elements 20 apart, if a user attempts to operate the camera 10 with the label 16 removed. This biasing protects against intermittent engagement of the first and second mechanical elements 20 and resulting wear if the camera 10 is operated with the label 16 removed. One-time use cameras 10 are generally recycled in whole or in part. Such wear may be difficult to detect during a subsequent recycling of the camera 10.

The film transport 14a, casing 24, and label 16 are configured such that, in the metered position, the label 16 is minimally distended by the contact portion of the blocker arm 72; and, in the non-metered position, the label 16 is maximally distended by the contact portion of the blocker arm 72. The minimal distention in the metered position is preferably sufficient to prevent rattling or other unintended movement of the first mechanical element 18 during use.

After film frame exposure, the shutter actuator 20c (discussed in detail below) strikes the metering lever 18a, pivoting the sprag 74 of the follower arm 70 out of the notch 67 of the primary cam 64 and unmeshing the engagement portion 76 of the blocker arm 72 from the thumbwheel 20b. The metering lever 18a pivots against the biasing of the label 16, pushing the contact portion outward through the gap 22a and outwardly distending the label 16 over the gap 22a. The thumbwheel 20b is then rotated to advance the filmstrip 32 to the next film frame. The advancing filmstrip 32 rotates the cam unit 20a. As the filmstrip 32 is advanced, the sprag 74 rides on the circular margin 65 of the primary cam 64 and the metering lever 18a rests in the non-metered position. On completion of advancement, the sprag 74 reaches the notch 67. The biasing by the label 16 causes the metering lever 18a to pivot, swinging the sprag 74 into the notch 67 and rotating the metering lever 18a to the metered position.

Referring now particularly to FIGS. 2–6, mechanism 12b of the camera 10 has an anti-backup subsystem 14b. The first mechanical element 18 is a pawl 18b and the second mechanical element 20 is the thumbwheel 20b. The pawl 18b is joined to the casing 24 and extends over gap 22b. It is currently preferred that the body 11 includes a frame 26, which defines the film chambers 36,40 and holds internal components; and front and rear covers 28,30, which enclose the frame 26. The back cover 30 includes the gap 22. The pawl 18b and back cover 30 can be parts of a one-piece plastic casting. The pawl 18b is positioned in close proximity to the thumbwheel 20b. The pawl 18b has a projection 80 that extends toward the thumbwheel 20b. The projection 80 is complementary to a gullet 52 of the thumbwheel 20b. The pawl 18b is deflectable inward and outward, relative to the thumbwheel 20b, between a meshed or engaged position and a bypass or first disengaged position. In the meshed position, the projection is enmeshed between a pair of teeth 50 of the thumbwheel 20b. In the bypass position, the projection 80 contacts the apex of a tooth 50.

Figure 13A:
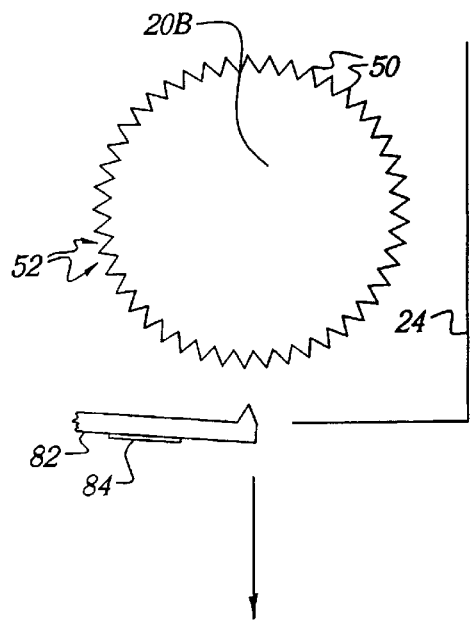
FIG. 13 is a diagram of an embodiment of the method of rendering a one-time use camera operative.
Figure 13B:
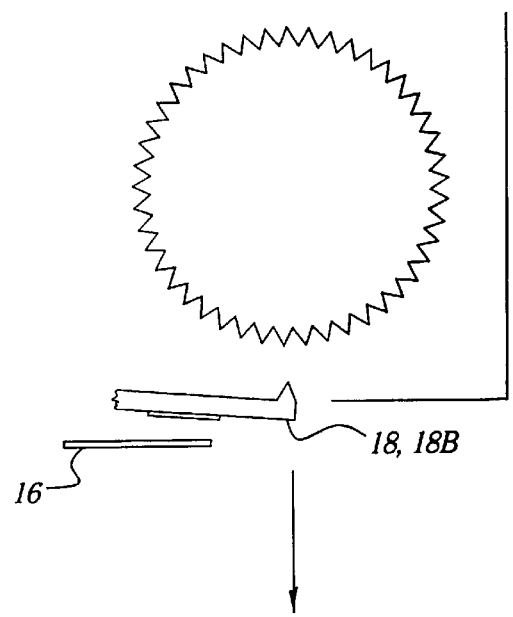
Figure 13C:
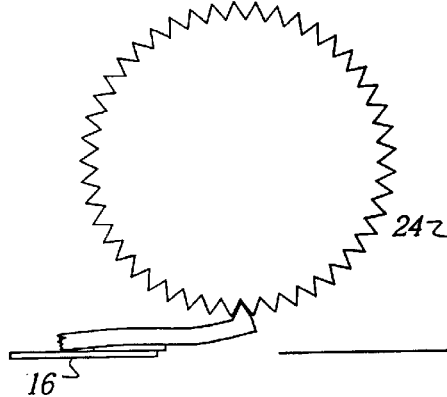

The label 16 is adhered to the back cover 30 and overlaps the pawl 18b either completely or partially. The label 16 biases the pawl 18b toward the meshed position. The thumbwheel 20b, pawl 18b, casing 24, and label 16 are configured such that, in the meshed position, the label 16 is minimally distended by the pawl 18b; and, in the bypass position, the label 16 is maximally distended by the pawl 18b. In the embodiment shown in the figures, the pawl 18b has a stem 82 that is aligned with the outer surface 83 of the back cover 30 when the label 16 is not attached (shown in FIG. 13). The pawl 18b also has a protrusion 84 that extends outward from the stem 82. The label 16 bears on the protrusion 84. When the label 16 is attached and minimally distended, the pawl 18b is in the meshed position and the protrusion 84 is aligned with the outer surface 83 of the back cover 30.

The thumbwheel 20b, pawl 18b, and label 16 function like a ratchet and pawl mechanism. At rest, with the label 16 attached over the pawl 18b, the projection 80 of the pawl 18b is in the meshed position, firmly seated in a gullet 52 between a pair of adjacent teeth 50 of the thumbwheel 20b. When the thumbwheel 20b is initially rotated in the forward direction, the pawl 18b bends outward and the projection 80 is withdrawn from the gullet 52 along a face of an adjoining tooth of the thumbwheel 20b. The projection 80 reaches the bypass position against the apex of a tooth 50. Further rotation moves the projection 80 past the apex and the biasing of the pawl 18b propels the projection 80 into the next gullet 52 and returns the pawl 18b to the meshed position. The cycle is repeated for each gullet 52 and tooth 50 as the thumbwheel 20b rotates forward. Ratchet and pawl mechanisms typically make a clicking noise when rotated in the forward direction as the pawl steps along the teeth of the ratchet. With the subsystem 14b herein, that noise is muffled by the label 16.

With the label 16 in place, the pawl 18b allows rotation of the thumbwheel 20b in only the forward direction, indicated by arrow 58 in FIG. 3. If the user attempts to rotate the thumbwheel 20b in the reverse direction, the projection 80 of the pawl 18b engages an adjoining face of a tooth 50 of the thumbwheel 20b and the pawl 18b is bent inward. The sprag 74 is retained within the notch 67 and the thumbwheel 20b does not rotate further in the reverse direction.

When the label 16 is not attached to the back cover 30, the pawl 18b is in the first disengaged position or is in a second disengaged position in which the projection 80 of the pawl 18b is spaced from the thumbwheel 20b; and the thumbwheel 20b is freely rotatable in either direction of rotation. The pawl 18b can be biased solely by the label 16. In this case, absent the label 16, the pawl 18b can deflect freely between the engaged and disengaged positions. For example, the pawl 18b can be loosely hinged to the casing 24. It is more convenient if the pawl 18b is resilient and unflexed in the second disengaged position and, thus, has internal biasing toward disengagement. This can be readily provided by the use of a pawl 18b of molded plastic formed in one-piece with the back cover 30. Biasing provided by the label 16 is additive with internal biasing of the pawl 18b. (Biasing outward from the enmeshed position is negative in sign relative to the label 16 biasing.) It is preferred that any biasing provided by the pawl 18b be a small percentage of the biasing provided by the label 16. This allows greater tolerances for features of the pawl 18b that effect internal resilience, such as thickness or straightness of the stem 82. On the other hand, label tolerances are more critical. This is an acceptable trade off, since it is easier to maintain tolerances of label characteristics than tolerances of molded plastic parts.

The presence of the anti-backup subsystem 14b in a single use camera 10 allows the use of a novel film loading method. Referring now particularly to FIG. 10, a camera frame 26 is initially provided. The frame 26 has opposed film supply and film cassette chambers 36,40 and an exposure chamber 42 between the other chambers 36,40. A film cartridge 38 is loaded into the film cartridge chamber 40. For simplicity, the method is explained herein as a predominantly manual procedure and is illustrated using a second spool (in addition to the film cartridge spool). The cartridge is a Type 135 (35 mm.) film cartridge in which a leading portion 88 of a filmstrip 32 protrudes from the unexposed film cartridge 38. Manual steps can be automated and modified in a manner well known to those of skill in the art. A second spool need not be used. See, for example, U.S. Pat. No. 4,972,649 and U.S. Pat. No. 5,873,002. (Camera features may have to be modified in accordance with the art to meet the requirements of particular equipment and procedures.) The method is also suitable for other types of film cartridges such as Advanced Photo System™ cartridges. With such a thrust cartridge, the method has a film thrusting step in which a film leader is propelled from the cartridge 38. This step can be performed manually using a thumbwheel 20b or other simple tool to rotate the film spool or using automated equipment.

A thumbwheel 20b is joined to the spool 45 of the film cartridge 38 and the leading portion 88 of the filmstrip 32 is attached to a second spool 89. The second spool 89 is placed, before or after attachment of the filmstrip 32, in the supply chamber 36. The second spool 89 has an external winding socket 90 that is exposed to the outside through a light-locked opening (not separately illustrated). The socket 90 is configured to closely receive a rotatable tool 91, such as a screwdriver, or Allen wrench or the like.

The frame 26 is then rendered light-tight by assembling the frame 26 with one or more cover members 28,30 to produce a camera frame assembly 392. It is currently preferred that the frame 26 is light-tight with only a back cover 30 attached to the frame 26. In this case, the front cover 28 can be attached to the frame 26 at that time or later, as desired. The term "camera frame assembly" is inclusive of a completed camera body 11 having both covers and lacking only a label 16 and of an incomplete camera body missing (in addition to the label) a cover or other parts or both. Once rendered light-tight by the addition of one or both covers 28,30, the camera frame assembly 92 can be subjected to a lighted environment.

The pawl 18b of the anti-backup subsystem 14b is joined to one of the covers 28,30 of the camera frame assembly 92 when the respective cover is installed. (For convenience, the pawl 18b is generally described herein as being joined to the back cover 30.) After installation of the back cover 30, the pawl 18b is disposed adjacent the thumbwheel 20b in the disengaged position. Since no label 16 is present, the thumbwheel 20b is rotatable in forward and reverse directions of rotation.

The rotatable tool 91 is then engaged with the socket 90 of the spool 89 and the tool 91 is rotated to move the filmstrip 32 in a prewind direction, indicated by arrow 93 in FIG. 10. A main portion 93 of the filmstrip 32 is then wound onto the second spool 89 and the rotatable tool 91 is disengaged.

The label 16 is then adhered to the back cover 30 overlapping the pawl 18b. The attachment of the label 16 completes the anti-backup subsystem 14, and deters any further rotation of the thumbwheel 20b in a prewind direction.

Referring now particularly to FIGS. 1, 3–4, and 7–8, mechanism 12c of the camera 10 has an exposure subsystem 14c. The first mechanical element 18 is a trigger 18c and the second mechanical element 20 is a shutter actuator 20c. The trigger 18c has a button 94 that extends through the gap 22c in the casing 24 and contacts the label 16. A contact portion 95 of the label 16 overlies the gap 22c and is adhered to the button 94. The label 16 can completely cover the button 94 or part of the button 94 can be exposed (not shown). The trigger 18c is movable between a set or engaged position, shown in FIG. 7 and a released or first disengaged position, shown in FIG. 8. The label 16 biases the trigger 18c toward the set position. As previously described in relation to the other embodiments, the first mechanical element 18, absent the label 16, can be movable beyond the first disengaged position to an second disengaged position. The trigger 18c can be freely movable between active and disengaged positions absent the label 16 or can be internally or externally biased toward disengagement (away from the engaged position). The trigger 18c, casing 24, and label 16 are configured such that, in the set position, the label 16 is minimally distended; and, in the released position, the label 16 is maximally distended. (This distention is reversible. The label is subject to irreversible deformation only when the camera is opened or disassembled.) The trigger 18c is illustrated as a freely movable separate part. A stem portion 96 helps hold the trigger 18c trapped between the thumbwheel 20b and the casing 24. The trigger 18c can be movably connected to the casing 24 or frame 26 and can also be internally biased in the same manner as described above for the pawl 18b of the anti-backup subsystem 14b. For example, the stem portion 96 can be flexible and can be joined to the casing 24 or frame 26 at the point indicated by arrow "A" in FIG. 7. When the button 94 is depressed by the user (indicated by arrow 97 in FIG. 8), the trigger 18c moves from the set position depicted in FIG. 3 to the released position depicted in FIG. 4. In the set position, the trigger 18c holds the shutter actuator 20c in a charged position depicted in FIG. 3 against the biasing of an actuator spring 98.

As the trigger 18c is moved to the released position, the trigger 18c releases the shutter actuator 20c. The shutter actuator 20c then moves to a discharged position under the biasing of the actuator spring 98. In the embodiment shown in FIGS. 3–4 and 7–8 the shutter actuator 20c is mounted to pivot about a vertical axis and is urged by the actuator spring 98 to rotate counterclockwise in FIGS. 3 and 4, which is to the right in FIGS. 7–8. The movement of the shutter actuator 20c to the discharged position causes the shutter actuator 20c to strike the shutter 46 at tab 101. The shutter 46 then moves from a closed position to a fully open position. The shutter 46 returns to the closed position under the biasing of a shutter spring 100. The movement of the shutter 46 uncovers an exposure aperture 48 allowing light to enter and expose the film frame. The shutter actuator 20c continues to rotate (counterclockwise in FIGS. 3–4) until an abutment 102 (best seen in FIG. 3) on the shutter actuator 20c strikes the metering lever 18a This pivots the metering lever 18a (counterclockwise in FIGS. 3–4), disengages the sprag 74 of the follower arm 70 from the notch 67 in the primary cam 64, and releases the blocker arm 72 from engagement with the thumbwheel 20b. After the exposure, the user stops depressing the trigger 18c and the trigger 18c returns to the set position due to the biasing of the label 16. The film 32 is then advanced to position the next frame 26 in the exposure position. Movement of the film 32 rotates the cam unit 20a. The secondary cam 66 engages an extension 73 of the shutter actuator 20c and rotates the shutter actuator 20c back to the charged position behind the latch 104 (shown in FIGS. 7–8) of the trigger 18c. The latch 104 is in the set position, in which the shutter actuator 20c can be received, because of the biasing by the label 16.

Figure 9:
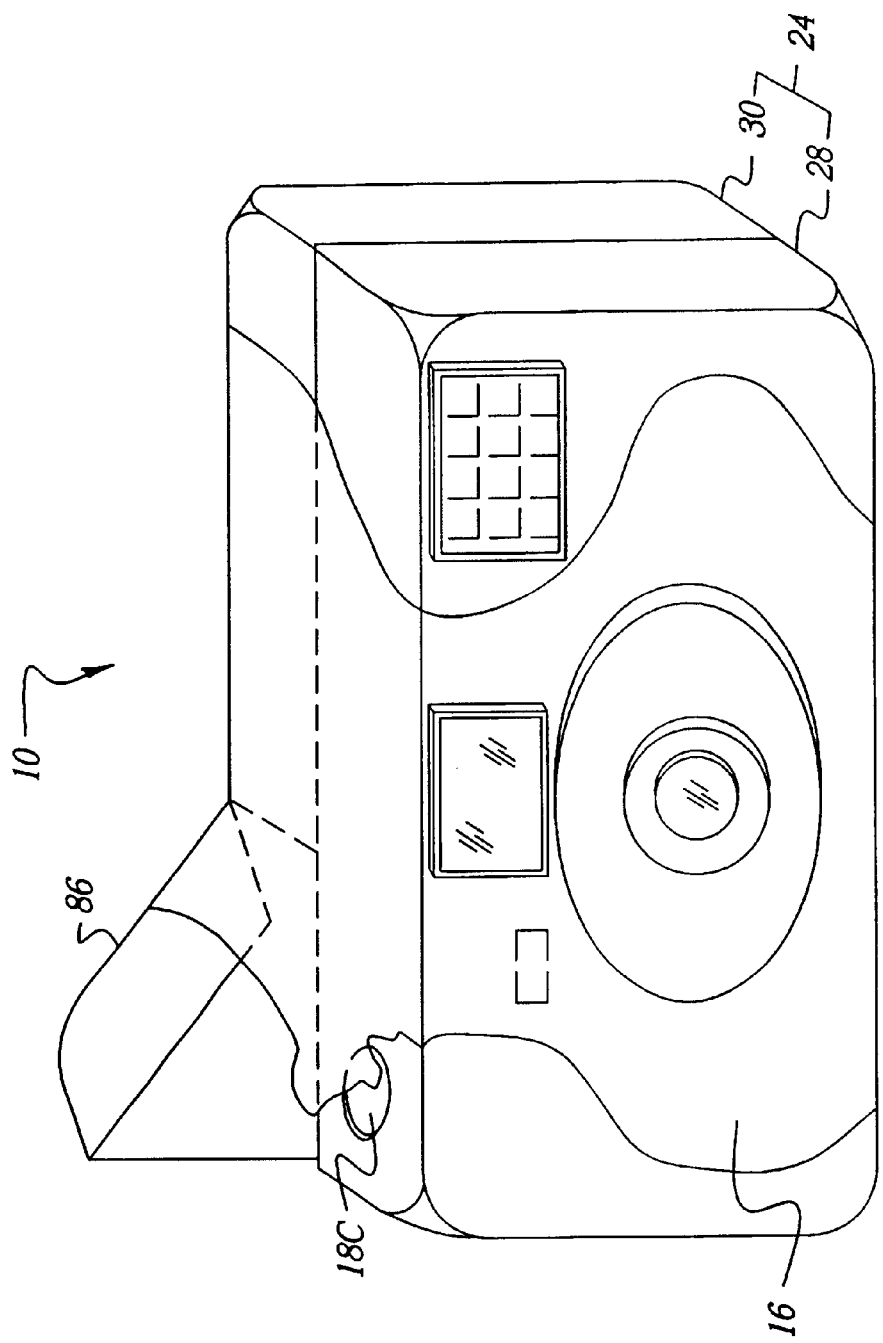
FIG. 9 is a front perspective view of the camera of FIG. 1 with the film door opened.

Referring now particularly to FIGS. 1 and 9, the casing 24 of the camera 10 has an openable part 86, such as a door or separable cover, overlapped by the label 16. The openable portion 86 that can be moved, relative to a non-opening portion 85, from a closed position to an open position. In the open position, the body is open and access is provided for removal of exposed film or a battery or both. For convenience, the following discussion is directed to a door 86, but like considerations apply to other openable parts, such as separable cover parts. In additional to the door 86, the label 16 also overlaps the first mechanical element 18 of a camera subsystem 14. As shown in FIG. 9, when the door 86 is opened, an overlap portion 87 of the label 16 is pulled by the door 86 and is disrupted over the first mechanical element 18 sufficiently to cause the label 16 to cease biasing the first mechanical element 18. The overlap portion 87 or the label 16 as a whole can be disrupted by inelastic stretching required to open the door 86 or the overlap portion 87 can made with a friable area (not separately illustrated), such as a perforated tear line, that is disrupted when the door 86 is opened. The effected subsystem 14 cannot be restored until the label 16 is replaced. The disruption of the label 16 ensures that the label 16 is replaced whenever the camera 10 is reloaded. This is important, since the label 16 is on the outside of the camera 10 and subject to wear and damage. The label 16 must also be sufficiently resistant to permanent deformation to provide required biasing during use prior to gap 22 of an operable portion 86. For use in a one-time use camera 10 it is preferred that the label 16 deform elastically at a low level of stress and deform in elastically at a relatively high level of stress. A convenient label 16 deforms elastically when a force of up to one kilo pascals is applied and has a resistance force without inelastic deformation of about 1.5 kilo pascals. An example of a suitable label 16 material is a polymeric blend of polystyrene and polyethylene.

Figure 11:
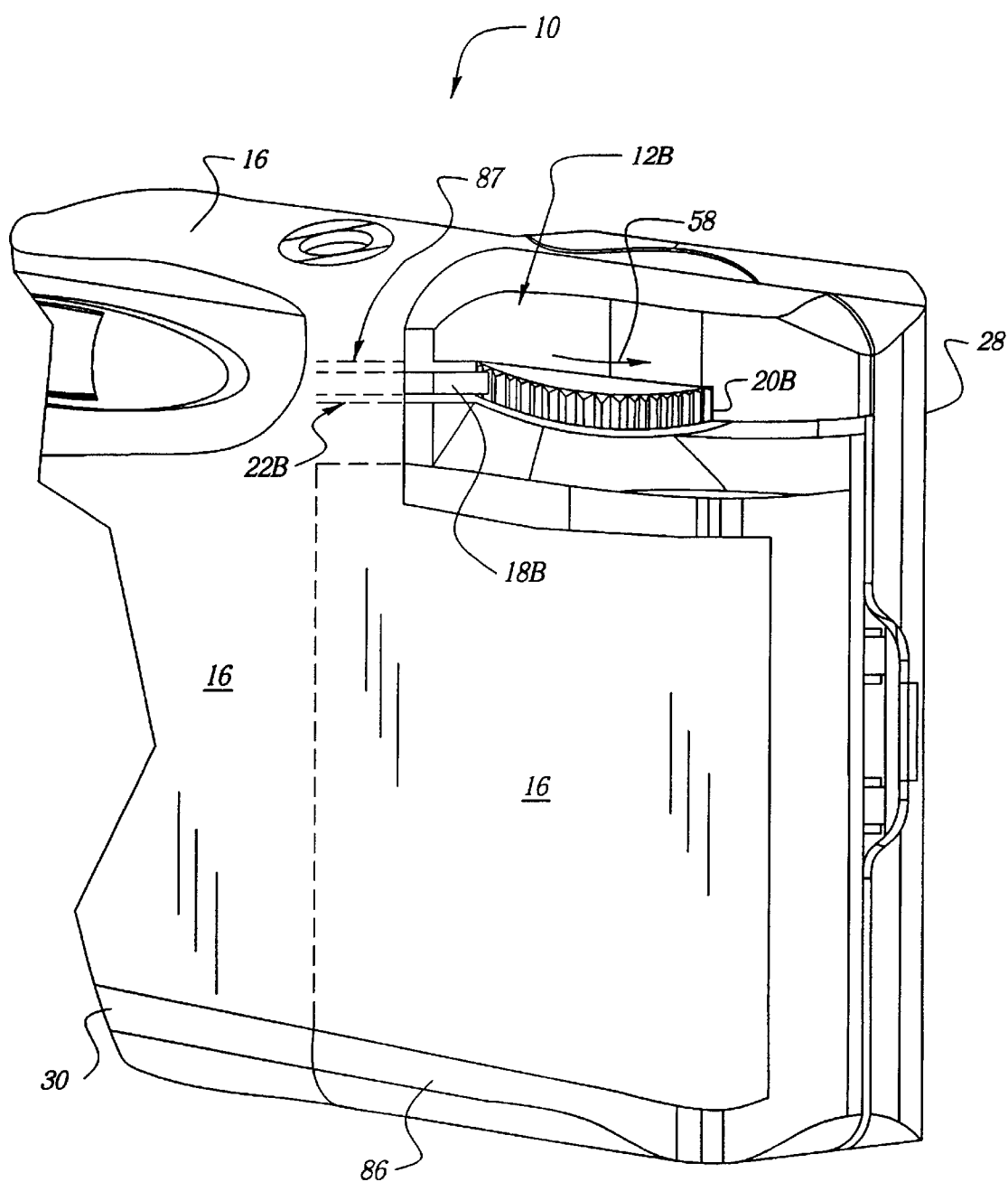
FIG. 11 is a perspective view of an embodiment of the camera showing the film door in a closed position.
Figure 12:
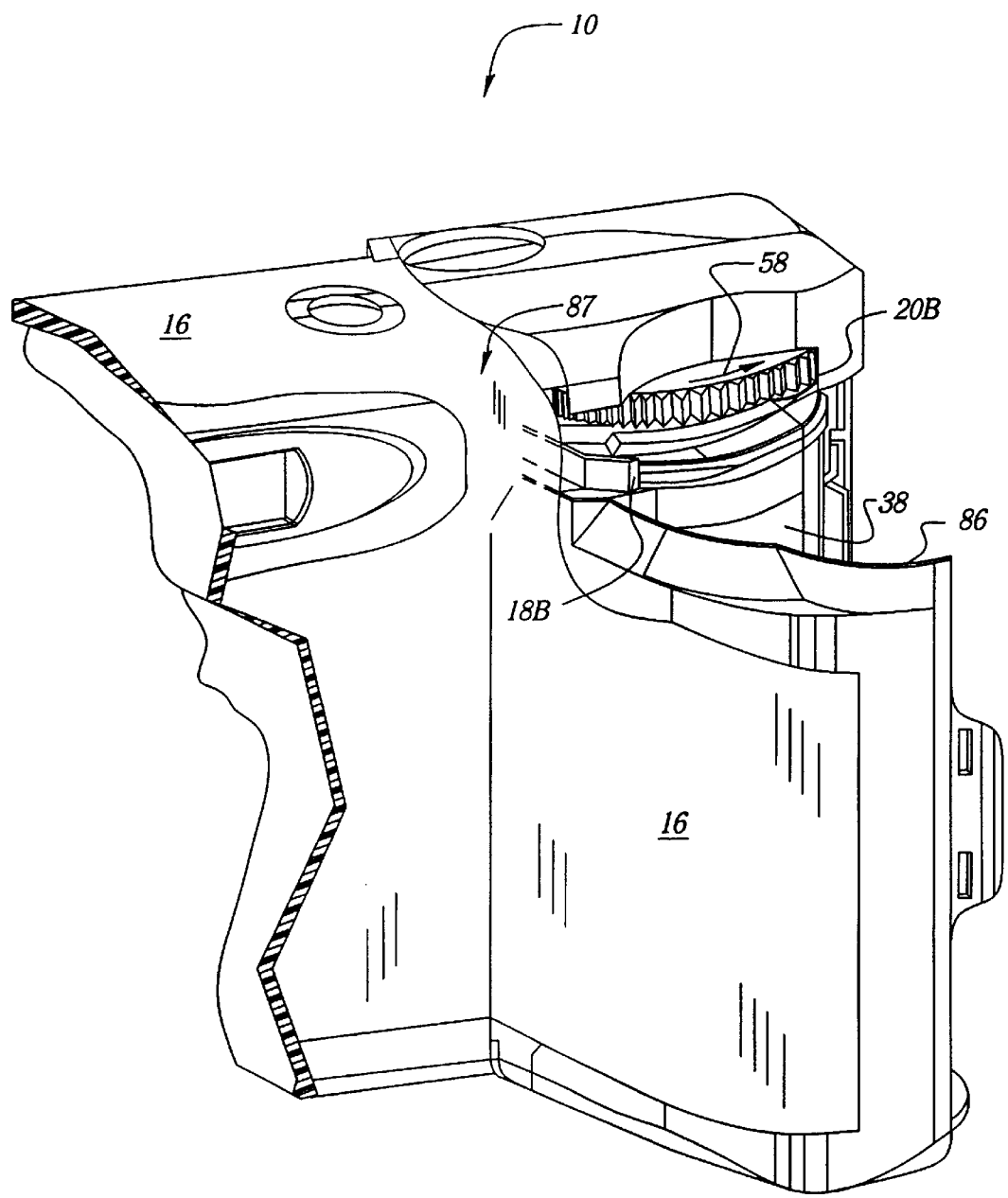
FIG. 12 is the same view as FIG. 11, but the film door is in an open position.

Referring now particularly to FIGS. 11–12, in a particular embodiment of the invention, the pawl 18b is breakable and breaks when the label is disrupted. The openable portion is a door 86 that pivots open for removal of exposed film. The label 16 is positioned on the body 11 such that when the door 86 is opened an overlap portion 87 of the label 16 attached to the pawl 18b is pulled outward in a direction away from the thumbwheel 20b and from the cover 30. The pawl 18b is breakable and breakage occurs when the door 86 is opened. The adhesion between the label 16 and the pawl 18b is such that the pawl 18b breaks rather than detaching from the label 16 and the broken pawl 18b remains attached to the label 16. For one-time use camera 10 recycling, the cover 30 is replaced and a new label 16 is attached.

Referring now particularly to FIGS. 2, 5–6, and 13, in a method for rendering a one-time use camera operative, a camera frame assembly 92 lacking a label 16 is aligned (106) with a compliant label 16. The gap 22 in the casing 26 of the camera frame assembly 92 is lined up with an overlap portion 87 of the label 16. The label 16 is then attached (108) to the casing 24 biasing the first mechanical element 18 toward the engaged position, as above discussed. This method is illustrated in relation to the anti-backup subsystem 14b, but is applicable to other subsystems 14 in the same manner.

Features of the invention can be varied. For example, instead of pivoting, The first mechanical element can move linearly or combine linear and rotary movement.

The invention has been described in detail with particular reference to certain preferred embodiments thereof, but it will be understood that variations and modifications can be effected within the spirit and scope of the invention.

What is claimed is:

1. A camera comprising:
   a casing;
   a subsystem having a first mechanical element and a second mechanical element, said first mechanical element being movable relative to said casing, between an engaged position and a disengaged position, said mechanical elements being engaged and said subsystem being operative in said engaged position, said subsystem being inoperative in said disengaged position;
   a label attached to said casing, said label bearing on said first mechanical element and biasing said first mechanical element toward said engaged position and away from said disengaged position.

2. The camera of claim 1 wherein said label is compliant.

3. The camera of claim 2 wherein said subsystem biases said first mechanical element in a direction away from said engaged position and said label overcomes said biasing by said subsystem.

4. The camera of claim 1 wherein said label is detachable from said casing and said first mechanical element is movable relative to said casing, between an engaged position and first and second disengaged positions, when said label is detached, said first disengaged position being between said engaged position and said second disengaged position; and said label attached to said casing blocks movement of said first mechanical element from said first disengaged position to said second disengaged position.

5. The camera of claim 4 wherein said subsystem biases said first mechanical element toward said second disengaged position and said label attached to said casing overcomes said biasing.

6. The camera of claim 1 wherein said first mechanical element is a metering lever pivotably mounted in said casing, and said second mechanical element is a cam unit rotatably mounted in said casing.

7. The camera of claim 1 wherein said first mechanical element is a pawl and said second mechanical element is a thumbwheel rotatably mounted in said casing.

8. The camera of claim 7 wherein said pawl is resilient and is joined to said casing.

9. The camera of claim 8 wherein said pawl and said casing are a one-piece plastic casting.

10. The camera of claim 1 wherein said first mechanical element is a trigger accessible from an outside of said casing and said second mechanical element is a shutter actuator.

11. The camera of claim 1 wherein said casing has an openable portion and a non-opening portion, said openable portion moving relative to said non-opening portion from a closed position to an open position, said label overlaps said openable portion, and said moving of said openable portion disrupts said label sufficiently to cease said biasing of said first mechanical element.

12. A camera comprising:
    a casing;
    a subsystem having a resilient pawl joined to said casing and a thumbwheel rotatably mounted in said casing, said pawl being movable relative to said casing, between an engaged position and a disengaged position, said mechanical elements being engaged and said subsystem being operative in said engaged position, said subsystem being inoperative in said disengaged position;
    a label attached to said casing, said label biasing said first mechanical element toward said engaged position;
    wherein said casing has an openable portion and a non-opening portion, said openable portion moving relative to said non-opening portion from a closed position to an open position, said pawl having a frangible connection to said non-opening portion, said label being adhered to said openable portion and said pawl, and said moving of said openable portion disrupts said label sufficiently to break said pawl.

13. The camera of claim 12 wherein said pawl and said casing are a one-piece plastic casting.

14. A camera comprising:
    a casing;
    a subsystem having a first mechanical element and a second mechanical element, said first mechanical element being movable relative to said casing, between an engaged position and a disengaged position, said mechanical elements being engaged and said subsystem being operative in said engaged position, said subsystem being inoperative in said disengaged position;
    a label attached to said casing, said label biasing said first mechanical element toward said engaged position;
    wherein said casing has an openable portion and a non-opening portion, said openable portion moving relative to said non-opening portion from a closed position to an open position, said first mechanical element having a frangible connection to said non-opening portion, said label being adhered to said openable portion and said first mechanical element, and said moving of said openable portion disrupts said label sufficiently to break said first mechanical element.

15. A method for rendering a one-time use camera operative, said method comprising the step of:
    aligning a camera frame assembly and a compliant label, said camera frame assembly having a gap and a subsystem having a first mechanical element and a second mechanical element, said gap being uncovered, said first mechanical element being movable relative to said gap, between an engaged position and a disengaged position, said mechanical elements being engaged and said subsystem being operative in said engaged position, said subsystem being inoperative in said disengaged position;
    attaching a label to said camera frame assembly over said gap, said label bearing on said first mechanical element and biasing said first mechanical element toward said engaged position and away from said disengaged position.

16. A camera comprising:
    a casing;
    a plurality of subsystems, each said subsystem having a first mechanical element and a second mechanical element, said first mechanical element being movable relative to said casing, between an engaged position and a disengaged position, said mechanical elements being engaged and said subsystem being operative in said engaged position, said subsystem being inoperative in said disengaged position;
    a label attached to said casing, said label biasing each of said first mechanical elements toward said engaged position.

17. The camera of claim 16 wherein said label is compliant and contacts said first mechanical elements.

18. The camera of claim 16 wherein said label biases each of said first mechanical elements toward a respective said engaged position.

19. The camera of claim 17 wherein said first mechanical element is mounted for free movement between said engaged position and said second disengaged position.

20. A camera comprising:
    a casing;
    a subsystem having a first mechanical element and a second mechanical element, said first mechanical element being movable relative to said casing, between an engaged position and a disengaged position, said mechanical elements being engaged and said subsystem being operative in said engaged position, said subsystem being inoperative in said disengaged position;
    a label attached to said casing, said label biasing said first mechanical element toward said engaged position;
    wherein said label is detachable from said casing and said first mechanical element is movable relative to said casing, between an engaged position and first and second disengaged positions, when said label is detached, said first disengaged position being between said engaged position and said second disengaged position; and said label attached to said casing blocks movement of said first mechanical element from said first disengaged position to said second disengaged position; and wherein said label has a minimal distortion when said first mechanical element is in said engaged position and said label has a maximal distortion when said first mechanical element is in said first disengaged position.

* * * * *